United States Patent [19]
Bell

[11] Patent Number: 6,105,839
[45] Date of Patent: *Aug. 22, 2000

[54] SEATBACK CARRIER

[76] Inventor: Carolyn Bell, 353 Cypress Hill Dr., Pittsburgh, Pa. 15235

[ * ] Notice: This patent issued on a continued prosecution application filed under 37 CFR 1.53(d), and is subject to the twenty year patent term provisions of 35 U.S.C. 154(a)(2).

[21] Appl. No.: 08/977,828

[22] Filed: Nov. 25, 1997

[51] Int. Cl.⁷ .................................................... B60R 7/04
[52] U.S. Cl. ............................. 224/275; 224/572; 220/6; 220/9.3
[58] Field of Search ..................................... 224/275, 428, 224/432, 463, 459, 460, 495, 497, 498, 499, 533, 534, 572; 108/44; D12/416; 296/37.1, 37.8, 37.15, 37.16; 220/6, 9.3

[56] References Cited

U.S. PATENT DOCUMENTS

| | | | |
|---|---|---|---|
| 622,722 | 4/1899 | Smith | 224/432 |
| 657,135 | 9/1900 | Rothaermel | 224/463 |
| 1,489,527 | 4/1924 | Henry | 224/498 |
| 1,625,808 | 4/1927 | Hyde | 224/498 |
| 2,100,261 | 11/1937 | Montgomery | 224/275 |
| 2,204,824 | 6/1940 | Rock | 224/534 |
| 2,645,392 | 7/1953 | Gottsegen et al. . | |
| 2,672,988 | 3/1954 | Johnson . | |
| 2,708,062 | 5/1955 | Poyer . | |
| 2,947,546 | 8/1960 | Berlin | 220/6 |
| 3,690,446 | 9/1972 | Spainhour | 224/275 |
| 3,756,481 | 9/1973 | Schaefer . | |
| 3,970,344 | 7/1976 | Baumann . | |
| 3,986,649 | 10/1976 | Heimstra . | |
| 4,056,219 | 11/1977 | Hine, Jr. | 224/463 |
| 4,082,939 | 4/1978 | Walters et al. . | |
| 4,213,648 | 7/1980 | Steichen . | |
| 4,696,420 | 9/1987 | Kulik . | |
| 4,861,059 | 8/1989 | Shirk . | |
| 5,046,433 | 9/1991 | Kramer et al. | 108/44 |
| 5,226,576 | 7/1993 | Ellsworth | 224/572 |
| 5,269,229 | 12/1993 | Akapatangkul | 108/44 |
| 5,282,598 | 2/1994 | Greene . | |
| 5,288,001 | 2/1994 | Locarno . | |
| 5,340,140 | 8/1994 | Bynum . | |
| 5,356,061 | 10/1994 | Yu . | |
| 5,443,018 | 8/1995 | Cromwell | 108/44 |
| 5,868,294 | 2/1999 | Webster | 224/275 |

FOREIGN PATENT DOCUMENTS

| | | |
|---|---|---|
| 0 297 826 | 4/1989 | European Pat. Off. . |
| 521480 | 3/1921 | France ..................... 224/36 |
| 2 562 486 | 10/1985 | France . |
| 2 667 250 | 4/1992 | France . |
| 35 38966 | 5/1987 | Germany . |

*Primary Examiner*—Gregory M. Vidovich
*Attorney, Agent, or Firm*—Kirkpatrick & Lockhart LLP

[57] ABSTRACT

The present invention provides a personal oxygen system carrier comprising a first frame member having a pair of horizontal support members connected across a pair of vertical support members, a second frame member having a pair of horizontal support members connected across a pair of vertical support members, an upper set of struts having first and second ends rotatably connected at each end to the first and second frame members, respectively, a lower set of struts having first and second ends rotatably connected at each end to the first and second frame members, respectively, and straps for attaching the carrier to the vehicle seatback. The carrier may also be outfitted with a base member adjacent to the lower set of struts and additional support strut members to reinforce the carrier. Retention straps are also provided for securing the oxygen system within the carrier when in use.

7 Claims, 3 Drawing Sheets

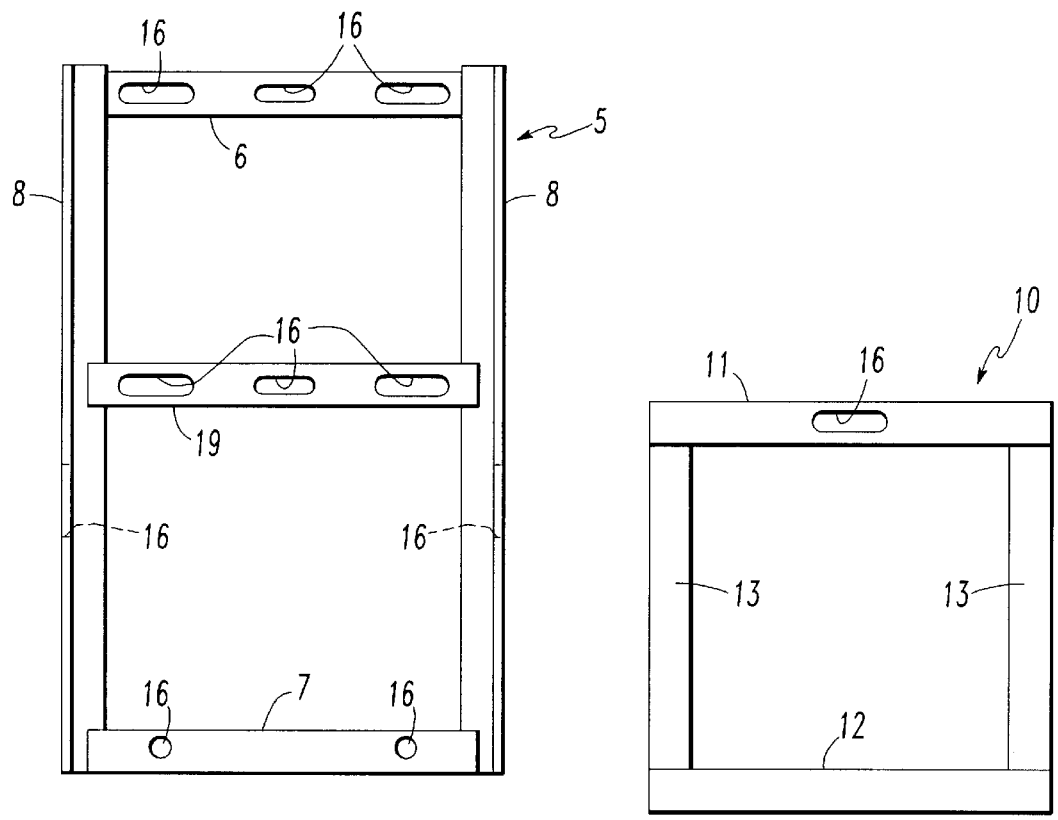
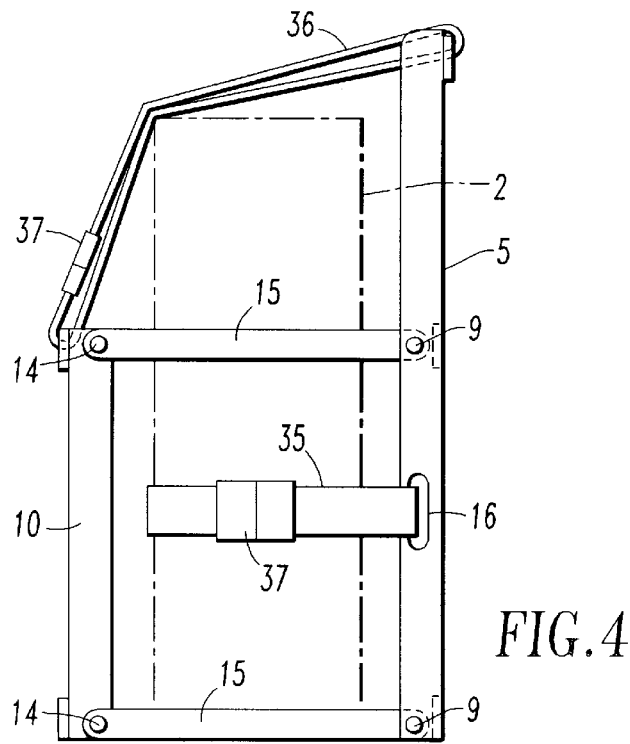

SEATBACK CARRIER

BACKGROUND OF THE INVENTION

1. Field of The Invention

The present invention relates to material transportation devices and, more particularly, to a material transportation device that is designed for attachment to the back of an automobile seat and that is capable of being biased between open and closed positions.

2. Description of the Invention Background

Through respiratorial disease, birth defect or other malady, numerous citizens of the United States and people throughout the world are dependent upon readily and constantly available sources of personal oxygen for their daily existence. Providing such a source of oxygen that is both effective in meeting the daily consumption needs of the user, efficient in its mode of transport and storage and safe in its operation has long been the challenge faced by purveyors of personal oxygen tank systems. As the general population grows more mobile, the need for such transportation systems continues to become even more pronounced.

Transportation systems of various design have been developed to aide in meeting the needs of those in need of personal oxygen systems. However, such systems are generally directed toward needs of the user when they are traveling under their own power. Carriers tailored to the needs of specific situations, in particular traveling in an automobile, have not received such emphasis. As a result, regardless of the particular needs of the user in a given situation, the carrier available to fill those needs is generally the same. Thus, in attempting to serve the universal needs of the user, existing carrier systems are deficient in certain scenarios.

In particular, existing systems are not well suited to effective use within an automobile. In general, while traveling within an automobile, for safety reasons, the carrier is required to hold the oxygen system securely in place and out of the way of the driver and passengers of the automobile. For convenience, the carrier should also be as unobtrusive as possible to the passengers and driver within the automobile by occupying as little space as possible both when in use and when in place awaiting use. Existing carriers, while meeting some of these objectives, have proven woefully inadequate at consistently meeting all of them.

When traveling in an automobile, existing carriers generally do not provide for safe and efficient storage of the tank system. Instead, the oxygen tank must often be laid on the seat beside the user. In such a position, the tank occupies space on the seat in the passenger compartment of the automobile that would otherwise be available for use by passengers. In addition, because the tank is generally not secured to any solid object, the potential exists for the tank to become a lethal projectile in the event of an automobile accident of even an abrupt stop.

In addition, retrofitting or adapting existing carrier systems that were not originally designed for use with personal oxygen tank systems has largely proven to be a fruitless effort. Personal oxygen systems are required to remain upright during use to prevent the nozzle on the system from freezing during use. Adequate venting is also required to provide for sufficient dissipation of any freezing temperatures that do develop around the nozzle area. Such needs are critical to the successful functioning of a personal oxygen system. When the personal oxygen system ceases to function, the supply of oxygen also ceases. Without such a supply of oxygen the user may become incapacitated and die. Leaving such a situation to chance by using a retrofitted carrier for use as a personal oxygen system carrier is thus quite undesirable. As such, a system specifically designed to meet the transportation needs of the personal oxygen system is required.

It is therefore desirable for a carrier provide for efficient and safe transport of a personal oxygen tank with the passenger compartment of an automobile, such that the tank may be operated by the user during transport.

SUMMARY OF THE INVENTION

In accordance with a preferred form of the present invention, there is provided a seat back carrier adapted to carry a personal oxygen system suspended from the back of an automobile seat. The carrier disclosed herein includes two opposing frames separated from each other by a plurality of struts. Each strut is rotatably connected at a point at either end to one of the frames such that one frame may be rotated with respect to the other, with the arc of rotation defined by the length of the struts. The full rotational movement of the struts is restricted such that the struts may be rotated between an open position, in which the struts are perpendicular to the frames and the frames are thus separated by the length of the struts, and a closed position, in which the struts are nearly parallel to the frame and the frames are in close communication with one another. In the open position, the struts and frames define a holding area sized to receive therein a personal oxygen system. In the closed position, the holding area is collapsed such that the carrier occupies a smaller overall area within the passenger compartment of the automobile.

A plurality of straps are provided for securing the carrier to the back of the seat and the oxygen tank to the carrier. Straps are provided for securing the carrier to the back of the seat. The straps are provided with hooks or clips such that, when the straps are threaded through apertures provided in the frame of the carrier, the hooks or clamps may be secured to the top of the seat. Elastic straps are also provided for further securing the carrier to the bottom of the seat and thus holding the carrier biased against the back of the seat. A plurality of retention straps are provided for securing the oxygen system to the carrier. The straps may be threaded through apertures provided in the frames and struts and interconnected with one another so as to encircle the oxygen system and secure it to the frame.

Accordingly, the present invention provides solutions to the aforementioned problems associated with existing personal oxygen tank automobile transport systems. The reader will appreciate that these and other details, objects and advantages will become apparent as the following detailed description of the present preferred embodiments thereof proceeds.

BRIEF DESCRIPTION OF THE DRAWINGS

In the accompanying drawings, preferred embodiments of the present invention are shown, wherein like reference numerals are employed to designate like parts and wherein:

FIG. 2 is a front view of the first frame;

FIG. 3 is a front view of the second frame;

FIG. 4 is a side view of the preferred embodiment of the present invention depicting the invention in use in the open position with a personal oxygen system;

DETAILED DESCRIPTION OF THE PREFERRED EMBODIMENTS

Figure 1:
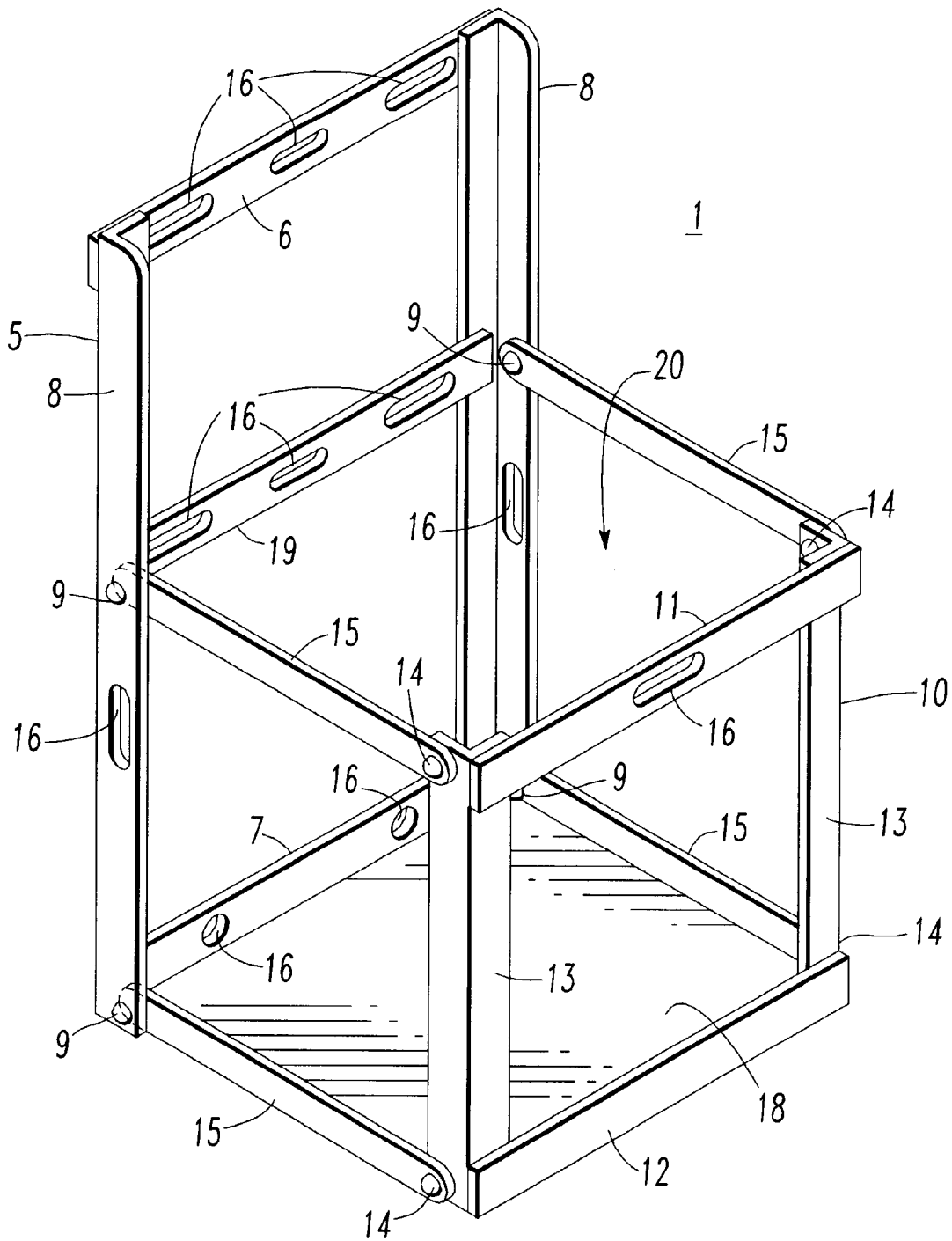
FIG. 1 is a perspective view of the preferred embodiment of the present invention depicting the invention in the open position.

Referring now to the drawings for the purposes of illustrating preferred embodiments of the invention only, and not for purposes of limiting the same, the Figures show a seat back carrier. More particularly and with reference to FIG. 1, the seat back carrier is shown generally at 1.

The carrier 1 is comprised of a first frame member 5 and a second frame member 10. It is preferred that the width of the first and second frame members 5 and 10 be equal to or greater than the cross-sectional diameter of a standard personal oxygen system 2 (see FIGS. 4 and 6).

In particular, the first frame member 5 (see FIG. 2) is comprised of an upper horizontal support member 6, a lower horizontal support member 7 and two generally vertical support members 8. Each of the support members 6, 7 and 8 are rigidly connected to each other at their ends by a bolt, weld or like rigid connection to form a parallelogram having generally right angles of intersection between the connected horizontal and vertical members. In the preferred embodiment, the support members 6, 7 and 8 are comprised of steel or aluminum, however, wood, plastic or other material possessing similar weight bearing characteristics could be used with equally satisfactory results.

In particular, the second frame 10 (see FIG. 3) is comprised of an upper horizontal support member 11, a lower horizontal support member 12 and two generally vertical support members 13. Each of the support members 11, 12 and 13 are connected to each other at their ends using a bolt, weld or like rigid connection to form a parallelogram having generally right angles of intersection between the connected members. In the preferred embodiment, the support members 11, 12 and 13 are comprised of steel or aluminum, however, wood, plastic or other material possessing similar weight bearing characteristics could be used with equally satisfactory results.

It will be appreciated by those of ordinary skill in the art that alternative structures could serve the equivalent function of the first and second frames 5 and 10. For example, the frames 5 and 10 could comprise sheet metal, wire mesh, or other generally planar material. In addition, in alternative embodiments, the first and second frames 5 and 10 could take the form of a plurality of other geometric shapes in addition to a parallelogram having right angles of connection. For example, an oval, some part thereof or other shapes could be used.

Figure 5:
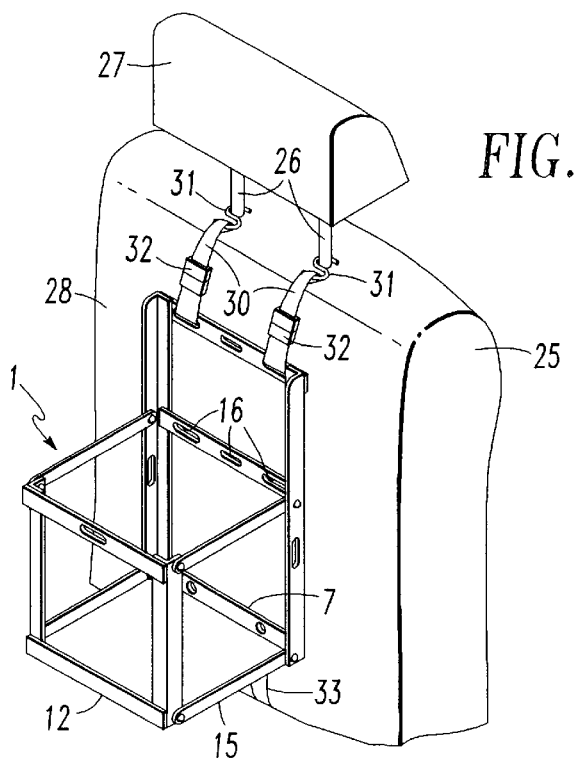
FIG. 5 is a perspective view of the preferred embodiment of the present invention depicting the invention on the back of an automobile seat in the open position.

Returning to FIG. 1, the two frame members 5 and 10 are connected to each other by a plurality of connection members 15. In the preferred embodiment, the plurality of connection members 15 comprise a plurality of struts. Each of the struts 15 is connected at one end to first frame 5 at a connection 9 and at the other end to second frame 10 at a connection 14. In each case, the means of connection 9 and 14 permits rotation of the strut 15 relative to the frame members 5 and 10, respectively. In the preferred embodiment, connections 9 and 14 are comprised of a rivet or pin. Each strut 15 is comprised of metal or aluminum, however, wood, plastic or other material with similar weight bearing characteristics could be used with equally satisfactory results. It is preferred that the maximum length of each strut 15 be at least equal to or greater than the cross-sectional diameter of a standard personal oxygen system 2. A plurality of apertures 16 are provided in vertical support members 8 and horizontal support members 6 and 11 for use in securing the carrier 1 to the seat-back 28 (see FIGS. 5, 6 and 7) and for securing the personal oxygen system 2 within the carrier 1 (see FIGS. 4 and 6).

It will be appreciated by one of ordinary skill in the art that alternative structures could serve the equivalent function of the struts 15. For example, the interconnecting members 15 could comprise a plurality of struts or rods, running diagonally between the first and second frames 5 and 10 and crossing in a scissors-type orientation. In the alternative, the interconnecting members 15 could include a plurality of struts or rods, attached in a sequence of interconnected of scissors-type constructions to form an accordion-type construction, connected at either end of the accordion-type construction to the first and second frames 5 and 10. Alternatively, the interconnecting members 15 could comprise a plurality of telescoping rods, connected at either end to the first and second frames 5 and 10. In any case, the structure 15 must be able to be moved between an open position in which the frames 5 and 10 are held in a spaced apart relationship with each other (see FIG. 1, 4, 5 or 6) and a closed position in which the frames 5 and 10 are held in close communication with each other (see FIG. 7).

A base 18 is provided along the plane formed by struts 15 and lower horizontal support members 7 and 12. The base 18 is formed of metal, plastic or other material with similar weight bearing characteristics. The base 18 may also take the form of a webbed mesh, a ply of canvas, or other material with like characteristics. The base 18 may be connected to interconnecting members 15 to facilitate movement of said first and second frames 5 and 10, respectively, as described more fully below.

Additional supplemental struts 19, such as the one shown in FIG. 2 as part of first frame 5, may be included in the design of the carrier 1 to provide for increased strength and durability. The supplemental strut 19 has a plurality of aperatures 16 provided therein. Though the supplemental strut 19 is shown as horizontal, it will be appreciated that such a supplemental strut 19 could also be vertical or diagonal.

Figure 6:
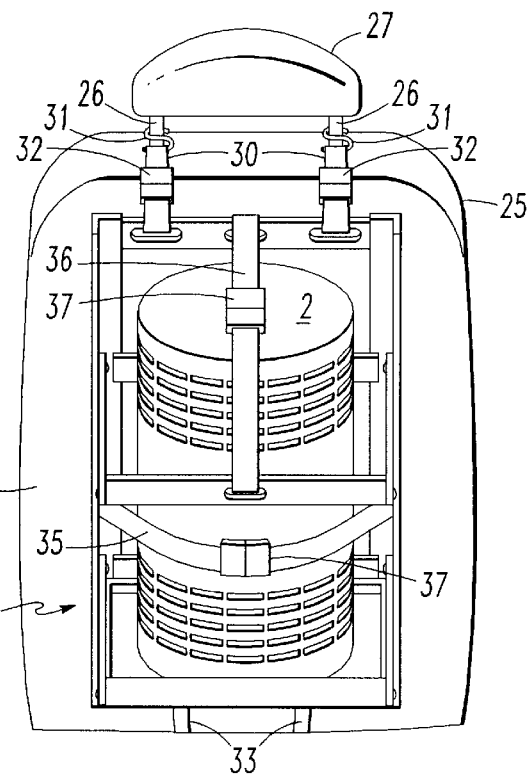
FIG. 6 is a perspective view of the preferred embodiment of the present invention depicting the invention in use on the back of an automobile seat.
Figure 7:
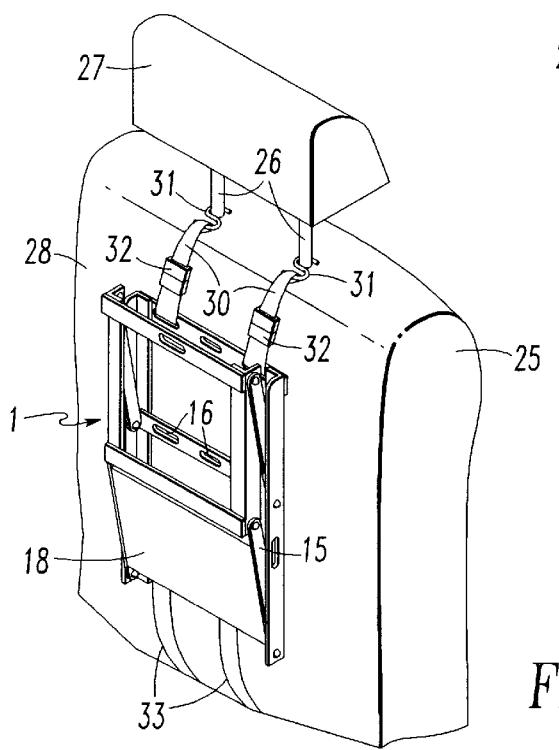
FIG. 7 is a perspective view of the preferred embodiment of the present invention depicting the invention on the back of an automobile seat in the closed position.

As shown in FIG. 6, a pair of flexible support straps 30 are provided to secure the carrier 1 to the back 28 of an automobile seat 25. Support straps 30 typically include hook-like members 31 at either end of the straps 30 and a means 32 of adjusting the length of each of the straps 30. One end of each strap 30 is connected to a post 26 of a headrest 27 while the other end of each strap 30 is connected to an aperture 16 of member 6. Other connection schemes may be employed, such as a single strap, not shown, which loops around the posts 26 of the headrest 27. A biasing strap 33, preferably having an elastic component, is connected at the apertures 16 in member 7 and to the lower supports, not shown, of the seat 25. Because of the elastic component of biasing strap 33, the carrier 1 is held in tension, biased against the seatback 28. Other schemes may be employed, such as a pair of biasing straps, as shown in FIG. 7, depending upon the configuration of the seat 25.

In FIGS. 4 and 6, a pair of load retention straps 35 and 36 are provided to secure the personal oxygen system 2 in place between the first and second frame 5 and 10, respectively, of the carrier 1. Retention straps 35 and 36 typically include a means 37 for adjusting the length of the straps 35 and 36 so as to tighten the fit of the oxygen system 2 within the carrier 1 and avoid the potential of the oxygen system 2 moving about the passenger compartment of the automobile while in use.

It will be appreciated that the carrier 1 may be constructed without the base 18. For example, the lower horizontal members 7 and 12 could be constructed to be shorter in length than the upper horizontal members 6 and 11. In such a configuration, the top of the space 20, as defined by upper horizontal member 11, supplemental support member 19 and struts 15, would be sized to accept a personal oxygen system 2, while the bottom of the space 20, as defined by lower horizontal struts 7 and 12 and struts 15, would be smaller than the cross-sectional diameter of the personal oxygen system 2. As such, a personal oxygen system 2 would be held in place against vertical members 8 and 13 within the carrier 1 without the need for a base 18. In another alternative, the load retention straps 35 and 36 could be adapted to tightly grip the personal oxygen system 2 within the space 20, and thereby suspend the oxygen system 2 such that the bottom of the personal oxygen system 2 would not contact the space otherwise occupied by a base 18.

It will also be appreciated that the first frame 5, second frame 10, supplemental support member 19, base 18 and connection members 15 may be stamped in completed form from individual sheets of metal rather than constructed from separate pieces of metal connected by welds, pins, adhesives and the like. In construction, each of the first frame 5 and supplemental support member 19, the second frame 10, the base 18 and the connection members 15 would be stamped from a unique die. Then, each of the resultant stamped pieces would then be interconnected in the manner described herein so as to create the present invention.

In operation, with the carrier in the closed position (see FIG. 7), support straps 30 and biasing strap 33 connect the carrier to the back 28 of the seat 25 as previously described. In such a position the first frame 5 is oriented against the seat-back 28 and the second frame 10 is in close communication with the first frame 5. To position the carrier 1 for use, the second frame 10 is rotated on struts 15 about points of connection 9 until the vertical supports 8 of the first frame member 5 and the struts 15 are substantially perpendicular to one another (see FIG. 5). In this open position, the first frame 5 and the second frame 10 are held in spaced relation to one another, separated by the length of the struts 15. As mentioned herein above, the length of each strut 15 and the length of each of the horizontal support members 6, 7, 11 and 12 is at least equal to that of the diameter of the personal oxygen system 2. As shown in FIGS. 4 and 6, the space 20 defined by the frames 5 and 10 and the struts 15 is sufficient to fit therein a personal oxygen system 2. Once the oxygen system 2 has been placed into the carrier 1, the retention straps 35 and 36 are secured around the oxygen system 2 using adjustment means 37. When the carrier 1 is no longer in use, the oxygen system 2 is removed and the second frame 10 is rotated on struts 15 in the opposite direction about connection 9 until it is returned to close communication with the first frame 5. As such, it can be seen that the carrier 1 occupies a minimal amount of space along the surface of seatback 28 within the passenger compartment of the automobile when not in use.

Those of ordinary skill in the art will, of course, appreciate that various changes in the details, materials and arrangements of parts which have been herein described and illustrated in order to explain the nature of the invention may be made by those skilled in the art within the principle and scope of the invention as expressed in the appended claims.

What is claimed is:

1. A carrier for mounting on a seatback of a vehicle, the seatback having a back portion, a headrest and posts connecting the headrest to the back portion, said carrier comprising:

a first frame member having upper and lower horizontal support members connected across a pair of vertical support members, said upper and lower horizontal support members defining a plurality of apertures;

a second frame member having upper and lower horizontal support members connected across a pair of vertical support members, at least one aperture provided in said second frame member;

an upper set of struts having first and second ends rotatably connected at each end to said first and second frame members, respectively, said upper set of struts being rigid throughout their length;

a lower set of struts having first and second ends rotatably connected at each end to said first and second frame members, respectively, said lower set of struts being rigid throughout their length;

a flexible member attached to said carrier and further connectable to the posts of the seatback such that said carrier is securely mountable on the seatback;

a load retention member for securing objects to the carrier, said load retention member threaded through at least one of said plurality of apertures defined by said upper and lower horizontal support members of said first frame member;

a base member adjacent to said lower set of struts; and a supplemental support having a plurality of apertures provided therein and disposed between said pair of vertical support members of said first frame.

2. A carrier for mounting on a vehicle seatback, said carrier comprising:

a first frame member having upper and lower horizontal support members connected a cross a pair of vertical support members;

a second frame member having upper and lower horizontal support members connected across a pair of vertical support members;

a plurality of upper struts, each said plurality of upper struts being rigid throughout its length and having first and second ends pivotally connected at each end to said first and second frame members, respectively, said second frame member pivotally mounted on said plurality of upper struts about said first frame members;

a plurality of lower struts, each said plurality of lower struts being rigid throughout its length and having first and second ends pivotally connected at each end to said first and second frame members, respectively, said second frame member pivotally mounted on said plurality of lower struts about said first frame member;

at least one first flexible mounting device attached to said upper horizontal member of said first frame member, said at least one first flexible mounting device for removably mounting said carrier on the vehicle seatback;

at least one second flexible mounting device attached to said lower horizontal member of said first frame member, wherein said upper and lower horizontal members are in opposing relationship with each other, said at least one second flexible mounting device for removably mounting said carrier on the vehicle seatback;

a plurality of apertures in said horizontal and vertical support members of said first frame member; and a load retention strap for securing objects to said carrier said load retention strap threaded through at least one of said plurality of apertures.

3. The carrier of claim 2 further comprising:

a base member connected to said lower struts.

4. The carrier of claim 2 further comprising:

a supplemental support disposed between said horizontal and vertical support members of said first frame member.

5. The carrier of claim 4 further comprising:

a plurality of apertures in said supplemental support.

6. The carrier of claim 2 wherein said pivotable connection comprises one of a pin, rivet and hinge.

7. A carrier system for use in a vehicle, said carrier system comprising:

a seatback of a vehicle having a back portion, a headrest and posts connecting said back portion and said headrest;

a first frame member having upper and lower horizontal support members connected across a pair of vertical support members;

a second frame member having upper and lower horizontal support members connected across a pair of vertical support members;

a plurality of upper struts, each of said plurality of upper struts being rigid throughout its length and having first and second ends pivotally connected at each end to said first and second frame members, respectively, said second frame member pivotally mounted on said plurality of upper struts about said first frame member;

a plurality of lower struts, each of said plurality of lower struts being rigid throughout its length and having first and second ends pivotally connected at each end to said first and second frame members, respectively, said second frame member pivotally mounted on said plurality of lower struts about said first frame member;

at least one first flexible mounting device attached to one of said upper horizontal support members and removably connected to said posts for removably mounting said carrier system on the vehicle seatback; and at least one second flexible mounting device attached to one of said lower horizontal support members and removably connected to said back portion, wherein said one of said upper horizontal support members and said one of said lower horizontal support members are in opposing relationship with each other, said at least one second flexible mounting device for removably mounting said carrier system on the vehicle seatback.

* * * * *